(12) United States Patent
Kenney (10) Patent No.: US 11,350,262 B1
(45) Date of Patent: May 31, 2022

(54) SELF-CONTAINED DISASTER CONDITION MONITORING SYSTEM

(71) Applicant: Daniel Kenney, Titusville, FL (US)

(72) Inventor: Daniel Kenney, Titusville, FL (US)

( * ) Notice: Subject to any disclaimer, the term of this patent is extended or adjusted under 35 U.S.C. 154(b) by 0 days.

(21) Appl. No.: 17/317,617

(22) Filed: May 11, 2021

(51) Int. Cl.
 *H04W 4/00* (2018.01)
 *H04W 4/90* (2018.01)
 *H04W 4/14* (2009.01)

(52) U.S. Cl.
 CPC .............. *H04W 4/90* (2018.02); *H04W 4/14* (2013.01)

(58) Field of Classification Search
 CPC ....... H04W 4/90; H04W 76/50; H04W 4/029; H04W 4/14
 See application file for complete search history.

(56) References Cited

U.S. PATENT DOCUMENTS

| | | | |
|---|---|---|---|
| 8,760,288 B2 | 6/2014 | Araiza-Boys et al. | |
| 8,907,799 B2 | 12/2014 | McKenna | |
| 8,937,546 B1 | 1/2015 | Baron, Sr. et al. | |
| 9,218,732 B2 | 12/2015 | Fiedler et al. | |
| 9,600,997 B1 | 3/2017 | Abrahams et al. | |
| 9,679,449 B2 | 6/2017 | Wedig et al. | |
| 9,693,386 B2 | 6/2017 | Gallo et al. | |
| 9,890,969 B2 | 2/2018 | Martin | |
| 10,121,361 B2 | 11/2018 | Deluliis et al. | |
| 10,360,780 B2 | 7/2019 | Balaji et al. | |
| 10,540,877 B1 | 1/2020 | Gersten | |
| 10,591,642 B2 | 3/2020 | Haupt et al. | |
| 10,692,339 B2 | 6/2020 | Beller et al. | |
| 10,832,551 B2 | 11/2020 | Wright et al. | |
| 2010/0197364 A1* | 8/2010 | Lee | H04M 1/72415 455/572 |
| 2013/0335550 A1 | 12/2013 | Rochenski et al. | |
| 2015/0091723 A1* | 4/2015 | Fiedler | G08B 19/00 340/521 |
| 2016/0203694 A1 | 7/2016 | Hogasten et al. | |

(Continued)

FOREIGN PATENT DOCUMENTS

| KR | 101395262 | 5/2014 |
|---|---|---|
| KR | 20160019322 | 2/2016 |

(Continued)

*Primary Examiner* — Omoniyi Obayanju
(74) *Attorney, Agent, or Firm* — John Rizvi; John Rizvi, P.A. —The Patent Professor®

(57) ABSTRACT

A self-contained disaster condition monitoring system to alert a user of one or more disaster conditions at a location via a personal electronic device includes a self-contained housing assembly having a housing unit, wherein the self-contained housing assembly is equipped with a self-contained monitoring assembly comprising at least a disaster condition sensor or a disaster condition detector. A user interface assembly is provided and is operable by a user to configure at least the sensor or the detector of the self-contained monitoring assembly. A communication assembly includes an SMS communication module configured to transmit a direct SMS alarm message to the personal electronic device upon detection of at least one disaster condition by the self-contained monitoring assembly. The system also includes a power supply assembly to provide power to at least the self-contained monitoring assembly and the communication assembly, wherein the power supply assembly includes a backup power supply.

1 Claim, 7 Drawing Sheets

(56) References Cited

U.S. PATENT DOCUMENTS

| | | | |
|---|---|---|---|
| 2018/0342329 A1 | 11/2018 | Rufo et al. | |
| 2018/0374330 A1* | 12/2018 | Balaji | G08B 25/14 |
| 2019/0324006 A1* | 10/2019 | Catlin, Jr. | G01D 21/02 |
| 2019/0353156 A1* | 11/2019 | Ward | F04B 49/08 |

FOREIGN PATENT DOCUMENTS

| | | |
|---|---|---|
| KR | 101613307 | 4/2016 |
| KR | 101923151 | 11/2018 |

\* cited by examiner

SELF-CONTAINED DISASTER CONDITION MONITORING SYSTEM

FIELD OF THE INVENTION

The present invention relates generally to a self-contained disaster condition monitoring system.

BACKGROUND OF THE INVENTION

It is often noted that a person's home is often the biggest investment a person will make in their lifetime. Similarly, for many business entities, an office building, manufacturing facility, warehouse, etc., may be one of the largest assets of the entity. As such, it only stands to reason that individuals as well as business entities often take considerable measures to secure and protect their homes, offices, etc.

To this end, and as is required by local regulations in many places, it is commonplace for a smoke detector and/or sprinkler system to be present in many commercial as well as residential facilities. Likewise, with the advent of the Internet and extensive Wi-Fi communication networks, it is not uncommon for many facilities to include remote access capabilities, video surveillance and/or a variety of remote alarms to alert an owner of the property of events occurring therein or thereon.

Furthermore, there are myriad devices available to monitor for other potentially devastating conditions that may impact a facility, whether a single family dwelling or a major manufacturing facility. These devices include such things as early warning earthquake and tornado detectors, as well as devices to monitor for water and/or gas leaks in a facility. Many of these known devices include one or more remote or wireless sensors positioned in various locations throughout the facility in communication with one or more dedicated alarm server. As will be appreciated, considerable time and effort is required to position remote or wireless sensors throughout a facility as well as to establish proper remote and/or wireless communication links between the sensors and corresponding alarm servers.

Typically, such devices provide an alarm, which may be audible, visible, or both, in and/or around the facility in which the device is positioned to monitor, so as to alert occupants of a facility of an impending or occurring disaster such that they may take appropriate action up to and including evacuating the location. Many of these devices also transmit a wireless alarm signal, such as via a Wi-Fi signal transmitted via an Internet connection, to an owner of the property so as to alert the owner of an impending and/or ongoing hazardous event occurring on the owner's property. Increasingly, such devices are configured to transmit an SMS text message directly to an owner or user of a particular monitoring device via the owner our user's cell phone or smart phone.

There are basically three types of SMS text messaging communication links in operation today. The first type of SMS text messaging communication link comprises a device sending a signal to a server via a remote Wi-Fi communication network. The server generates an SMS text message and subsequently transmits the SMS text message to an intended recipient via a cellular communication network. While effective under normal operating conditions, this first type of SMS text messaging communication link requires access to the Internet, which often requires a powered router or Wi-Fi hotspot. However, in the event of a disaster, it is not uncommon for disruptions to occur in electrical transmission lines as well as to Internet service itself. While backup power supplies may be provided to power a server and router in the event of a loss of power, the relatively large power consumption of these devices may severely limit their operational service life while relying upon a backup power supply. This may be further compounded for a facility having multiple types of monitoring devices communicating with different servers dedicated to the operation of each specific type of monitoring device, e.g., smoke detection, water detection, gas leak detection, etc.

Another type of SMS text messaging communication link involves a device transmitting a signal to a server via a cellular communication network. As before, the server generates an SMS text message and transmits it to an intended recipient via the same cellular communication. As will be appreciated, this type of SMS text messaging communication link requires considerable additional bandwidth of the cellular communication network which the device signals and the SMS text messages are being transmitted. Again, while effective under normal conditions, in the event of a disaster increase reliance upon cellular communication networks may because this type of SMS text messaging communication link to be unreliable, perhaps for long periods of time. Also, and as before, this may be further compounded for a facility having multiple types of monitoring devices communicating with different servers dedicated to the operation of each specific type of monitoring device, thereby further increasing the bandwidth requirements for operation of such systems.

Lastly, an SMS text messaging communication link consist of a device which directly generates an SMS text message and transmits the SMS text message via a cellular communication network. As will be appreciated, this form of an SMS text messaging communication link requires the least amount of bandwidth, thereby increasing the likelihood of transmittal of an SMS text message, even while the cellular communication network is experiencing high-volume usage, such as would be expected in the event of some form of disaster. It is further to be appreciated that this form of an SMS text messaging communication link is likely the last to fail as well as the first to recover in the event of a disruption due to some type of disaster.

Accordingly, there is an established need for a solution to one or more of the aforementioned shortcomings in currently available monitoring systems.

SUMMARY OF THE INVENTION

The present invention is directed generally to a self-contained disaster condition monitoring system. More in particular, in at least one embodiment the present invention is directed to a self-contained disaster condition monitoring system dimensioned and configured for rapid deployment and activation prior to evacuation of a location to alert a user of one or more disaster conditions at the location via a personal electronic device.

In a first implementation of the invention, a self-contained disaster condition monitoring system dimensioned and configured for rapid deployment and activation prior to evacuation of a location to alert a user of one or more disaster conditions at the location via a personal electronic device may have: a self-contained housing assembly including a housing unit; the self-contained housing assembly equipped with a self-contained monitoring assembly comprising at least one of a disaster condition sensor or a disaster condition detector, a user interface assembly operable to configure at least one of the disaster condition sensor or the disaster condition detector of the self-contained monitoring assembly; a communication assembly including an SMS communication module configured to transmit a direct SMS alarm message to the personal electronic device upon detection of at least one disaster condition; and, a power supply assembly disposed to provide power to the self-contained monitoring assembly, the user interface assembly and the communication assembly.

In a second aspect, the self-contained disaster condition monitoring system can include a self-contained monitoring assembly having a trace water detector.

In another aspect, the self-contained disaster condition monitoring system may have a self-contained monitoring assembly including at least one water level sensor to determine a presence of water proximate a self-contained housing assembly.

In a further aspect, the self-contained disaster condition monitoring system can include a self-contained monitoring assembly having a plurality of water level sensors to determine a presence of water proximate a self-contained housing assembly.

In one other aspect, the self-contained disaster condition monitoring system may have a self-contained monitoring assembly including a temperature sensor.

In yet another aspect, the self-contained disaster condition monitoring system can include a self-contained monitoring assembly having at least one hazardous gas detector.

In still one further aspect, the self-contained disaster condition monitoring system may have a self-contained monitoring assembly including a plurality of hazardous gas detectors.

In yet one other aspect, the self-contained disaster condition monitoring system can include a self-contained monitoring assembly having a seismic activity detector.

In still another aspect, the self-contained disaster condition monitoring system may have a self-contained monitoring assembly including a radiation detector, such as a Geiger counter.

In yet one further aspect, the self-contained disaster condition monitoring system can include a communication assembly having an SMS antenna mounted to a housing unit to transmit a direct SMS alarm message to a personal electronic device upon detection of at least one disaster condition.

In still one other aspect, the self-contained disaster condition monitoring system may have a user interface assembly including a selection button operable by a user to select from a plurality of configuration parameters.

In yet another aspect, the self-contained disaster condition monitoring system can include a user interface further having an LED status indicator having a plurality of LED lights operable in a plurality of lighting arrays each indicative of a different one of the plurality of configuration parameters.

In still one further aspect, the self-contained disaster condition monitoring system may have a communication assembly including a Wi-Fi communication module to connect to the Internet.

In yet one other aspect, the self-contained disaster condition monitoring system can include a power supply assembly having an external power supply interconnect.

In still another aspect, the self-contained disaster condition monitoring system may have a power supply assembly including a backup power supply.

In yet one further aspect, a self-contained disaster condition monitoring system dimensioned and configured for rapid deployment and activation prior to evacuation of a location to alert a user of one or more disaster conditions at a location via a personal electronic device can include: a self-contained housing assembly having a housing unit with a base unit mounted to a portion thereof to maintain the housing unit in an operative monitoring orientation; the self-contained housing assembly equipped with a self-contained monitoring assembly comprising at least one disaster condition sensor and at least one disaster condition detector; a user interface assembly comprising a selection button and an LED status indicator, the user interface assembly operable to configure the at least one disaster condition sensor of the self-contained monitoring assembly with at least one disaster condition alarm limit; the user interface assembly operable to configure the at least one disaster condition detector of the self-contained monitoring assembly with at least one other disaster condition alarm limit; a communication assembly including an SMS communication module and an SMS antenna cooperatively configured to transmit a direct SMS alarm message to the personal electronic device upon detection of at least one disaster condition; and, a power supply assembly disposed to provide power to the self-contained monitoring assembly, the user interface assembly and the communication assembly.

In still one other aspect, the self-contained disaster condition monitoring system may have a communication assembly including a Wi-Fi communications module to connect to the Internet and download system software upgrades.

In yet another aspect, the self-contained disaster condition monitoring system can include a communication assembly having a short-range wireless communication module to permit configuration of the self-contained monitoring assembly via the portable electronic device.

In still one further aspect, the self-contained disaster condition monitoring system may have a communication assembly further comprises a global positioning satellite module to permit the location of the self-contained housing assembly to be determined.

In still one further aspect, the self-contained disaster condition monitoring system may have a self-contained disaster condition monitoring system dimensioned and configured for rapid deployment and activation prior to evacuation of a location to alert a user of one or more disaster conditions at a location via a personal electronic device can include: a self-contained housing assembly having a housing unit with a base unit including a plurality of self-leveling support legs mounted to a portion thereof to maintain the housing unit in an operative monitoring orientation; the self-contained housing assembly equipped with a self-contained monitoring assembly comprising one or more of a trace water detector, a water level sensor, a temperature sensor, a hazardous gas detector and a radiation detector; a user interface assembly comprising a selection button and an LED status indicator, the user interface assembly operable to configure each of the water trace detector, the water level sensor, the temperature sensor, the hazardous gas detector and the radiation detector of the self-contained monitoring assembly with at least one corresponding disaster condition alarm limit; a controller assembly comprising a processor disposed in communication with the self-contained monitoring assembly to receive one or more disaster condition alarm signals from the self-contained monitoring assembly; a communication assembly including an SMS communication module and an SMS antenna cooperatively configured to transmit a direct SMS alarm message to the personal electronic device; the processor further configured to communicate with the communication assembly upon receipt of one or more disaster condition alarm signals from the self-contained monitoring assembly and to instruct the communication assembly to transmit to the direct SMS alarm message; and, a power supply assembly disposed to provide power to the self-contained sensor assembly, the user interface assembly, the communication assembly and the controller assembly.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower". "top", "bottom", "left", "right", "front". "rear", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is generally directed to a self-contained disaster condition monitoring system. More in particular, a self-contained disaster condition monitoring system, generally as shown as at 100 throughout the figures, is dimensioned and configured to be quickly and easily deployed in an operative orientation at a location and actuated by a user just prior to evacuation of the location in advance of an anticipated disaster condition occurring at the location, wherein the location may be a home, office, manufacturing facility, warehouse, etc. Alternatively, a self-contained disaster condition monitoring system 100 in accordance with the present invention is staged in an operative orientation at a location and actuated by a user prior to a planned period during which the location will be unoccupied such as for a vacation, a plant shutdown, etc.

Figure 1:
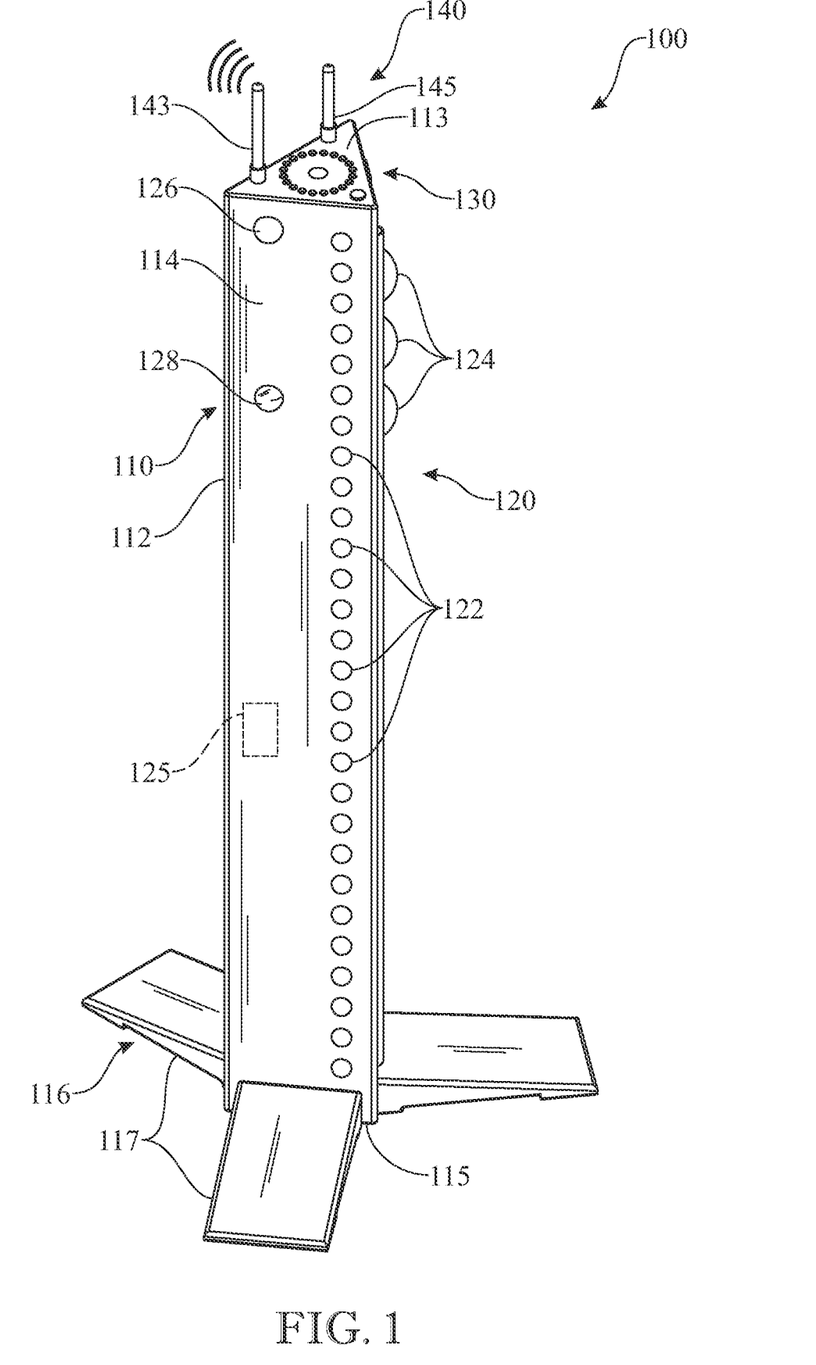
FIG. 1 presents a perspective view of one side of one illustrative embodiment of a self-contained disaster condition monitoring system, in accordance with the present invention.
Figure 2:
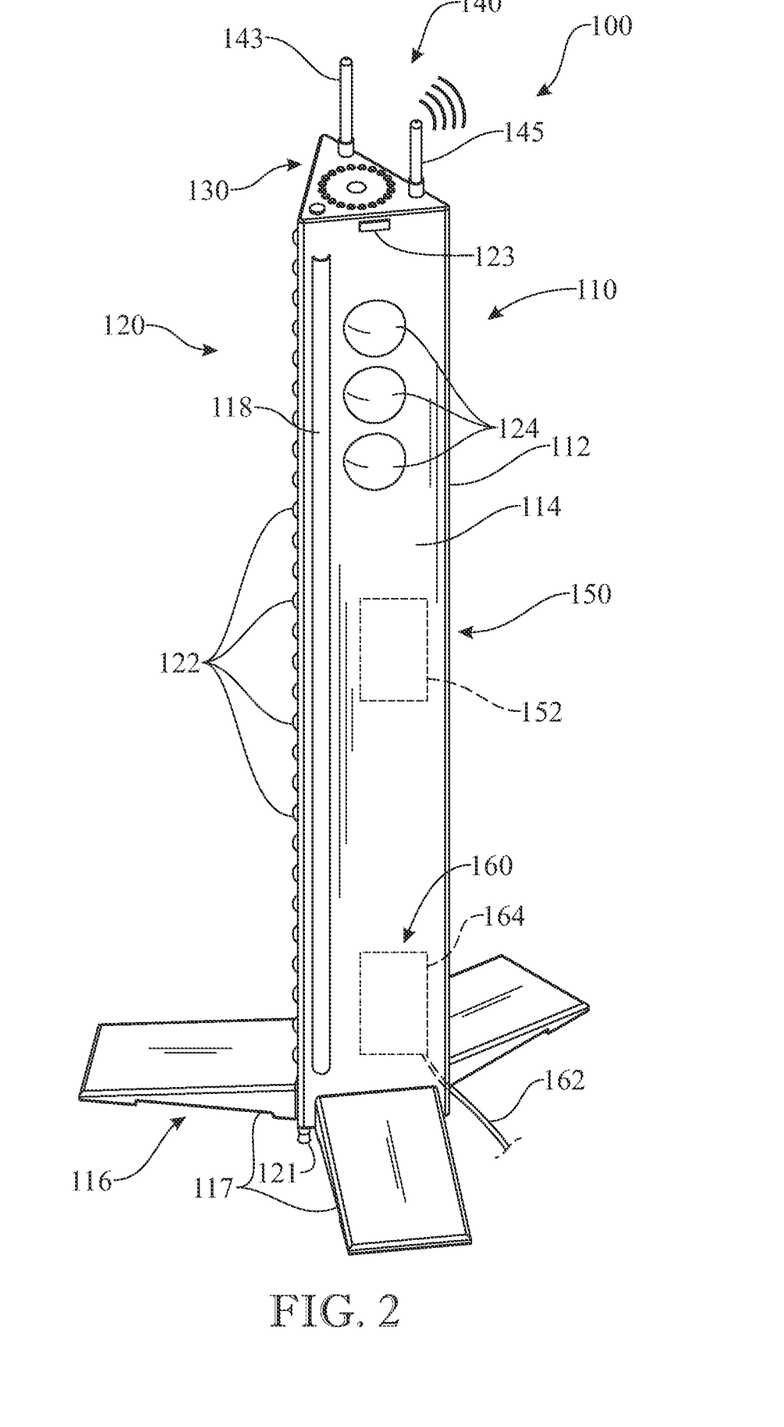
FIG. 2 presents a perspective view of another side of the illustrative embodiment of the self-contained disaster condition monitoring system of FIG. 1, in accordance with the present invention.

Referring initially to FIGS. 1 and 2, presented therein are perspective views along different sides of one illustrative embodiment of a self-contained disaster condition monitoring system 100, in accordance with the present invention. A self-contained disaster condition monitoring system 100 includes a self-contained housing assembly 110. In at least one embodiment, a self-contained housing assembly 110 includes a housing unit 112. As shown throughout the figures, a housing unit 112 includes a top 113, a bottom 115, and a plurality of sides 114 disposed thereinbetween. With reference again to FIGS. 1 and 2, the housing unit 112 of the self-contained housing assembly 110 in accordance with at least one embodiment of the present invention comprises a generally triangular cross-section having three oppositely disposed sides 114. As will be appreciated by those of skill in the art, is well within the scope and intent of the present invention for a housing unit 112 to comprise any of a number of other geometric cross-sectional geometric configurations including circular, oval, square, rectangular or other polygonal shape.

A self-contained housing assembly 110 in accordance with at least one embodiment of the present invention includes a base unit 116 mounted to a portion of the housing unit 112. More in particular, a base unit 116 is mounted to a portion of a housing unit 112 to maintain the housing unit 112 in an operative monitoring orientation. At least one further embodiment, a base unit 116 comprises a plurality of support legs 117. Looking once again to FIGS. 1 and 2, a base unit 116 in at least one embodiment of the present invention comprises a plurality of support legs 117 mounted proximate a bottom 115 of the housing unit 112, the plurality of support legs 117 extending outwardly therefrom so as to maintain the housing unit 112 in a generally upright and operative monitoring orientation.

A self-contained housing assembly 110 may be constructed from any of a variety of materials provided they exhibit sufficient strength and rigidity to support the various internal and external components comprised by the present self-contained disaster condition monitoring system 100. By way of example only, a self-contained housing assembly 110 and/or one or more of the components thereof may be constructed of metal, metal alloys, plastics, thermoplastics, fiberglass, graphite, composite engineered materials, or combinations thereof, etc. In at least one embodiment, a self-contained housing assembly 110, and the components thereof, are constructed of a water resistant material such that the present self-contained disaster condition monitoring system 100 continues to be functional even in moderate to heavy flood conditions, at least long enough to alert a user of an observed high water level, i.e., a flooding condition. In at least one further embodiment, a self-contained housing assembly 110, and the components thereof, are constructed of a fire resistant material such that the present self-contained disaster condition monitoring system 100 continues to be functional even in the extreme temperatures experienced in a fire, at least long enough to alert a user of the observed high temperature, i.e., a fire condition.

A self-contained housing assembly 110 of a self-contained disaster condition monitoring system 100 in accordance with the present invention is equipped with a self-contained monitoring assembly 120. In one embodiment, a self-contained monitoring assembly 120 includes at least one disaster condition sensor configured to monitor for and measure at least one disaster condition. More in particular, in at least one embodiment a self-contained monitoring assembly 120 includes at least one disaster condition sensor configured to measure at least one disaster condition and to generate a disaster condition alarm signal when a measured parameter reaches a disaster condition alarm limit. As just one example, in at least one embodiment of the present invention, at least one disaster condition sensor comprises a temperature sensor 123, such as is shown by way of example in FIG. 2, configured to generate a disaster condition alarm signal when a disaster condition alarm limit is measured such as, by way of example only, when a temperature of 1,100° F. is measured, which corresponds to the average temperature observed in common house res. As will be appreciated, other temperature limits may be a more appropriate disaster condition alarm limit in different locations, and alternative temperature limits may be preset at the factory or reset by a user of the present system 100.

A self-contained monitoring assembly 120 in accordance with the present invention may comprises any of a number of other disaster condition sensors including, but not limited to, one or more water level sensors 122, such as is shown by way of example in the illustrative embodiment of FIGS. 1 and 2. More in particular, a plurality of water level sensors 122 may be collectively configured to monitor and measure a level of water proximate a self-contained housing assembly 110, such as may be indicative of a flood condition proximate a self-contained disaster condition monitoring system 100. A water detector return 118 is provided in at least one embodiment and operates in conjunction with the plurality of water level sensors 122. More in particular, in at least one embodiment, each of the plurality of water level sensors 122 comprise a contact switch which closes when water rises to a level in which a corresponding one of the plurality of water level sensors 122 is bridged with the water detector return 118. Essentially, the water detector return 118 serves as a switch contact common to each of the plurality of water level detectors 122.

In at least one further embodiment, a self-contained monitoring assembly 120 further comprises a barometric pressure sensor 126, as shown by way of example in FIG. 1, configured to monitor and measure a barometric pressure proximate a self-contained housing assembly 110, such as may be indicative of severe weather event such as a tornado or a hurricane proximate a location in which a self-contained disaster condition monitoring system 100 in accordance with the present invention is staged and actuated.

In at least one other embodiment a self-contained monitoring assembly 120 includes at least one disaster condition detector configured to measure at least one disaster condition and to generate a disaster condition alarm signal when a measured parameter reaches a disaster condition alarm limit. For example, in at least one embodiment of the present invention at least one disaster condition detector comprises a hazardous gas detector 124 configured to generate a disaster condition alarm signal when a disaster condition alarm limit is measured such as, by way of example, when a specified concentration of a particular hazardous gas is measured. It is to be appreciated that a self-contained monitoring assembly 120 in accordance with the present invention may comprise a plurality of hazardous gas detectors 124, such as is shown by way of example in FIGS. 1 and 2, each configured to generate a disaster condition alarm signal when a disaster condition alarm limit is measured such as, once again, by way of example, when a specified concentration of a particular hazardous gas is measured. Is to be further appreciated that a hazardous gas detector 124 of a self-contained monitoring assembly in accordance with the present invention may be specifically configured to detect one or more of a number of known hazardous gases including, but in no matter limited to, methane, butane, propane, natural gas and other flammable gases, alcohol, ethanol, carbon monoxide, hydrogen, hydrogen sulfide, ozone, ammonia, benzene, toluene, acetone, formaldehyde, coal gas, smoke, etc., just to name a few. A hazardous gas detector 124 may be selected to monitor for a particular hazardous gas known to be present and/or stored at a particular residential or commercial facility, or they may be selected based on commonly known hazards such as carbon monoxide, natural gas, smoke, etc. As will be further appreciated, a disaster condition alarm limit value may vary greatly between the various types of hazardous gases which may be monitored for and measured by one or more of a plurality of hazardous gas detectors 124 of a self-contained monitoring assembly 120 in accordance with the present invention.

Figure 3:
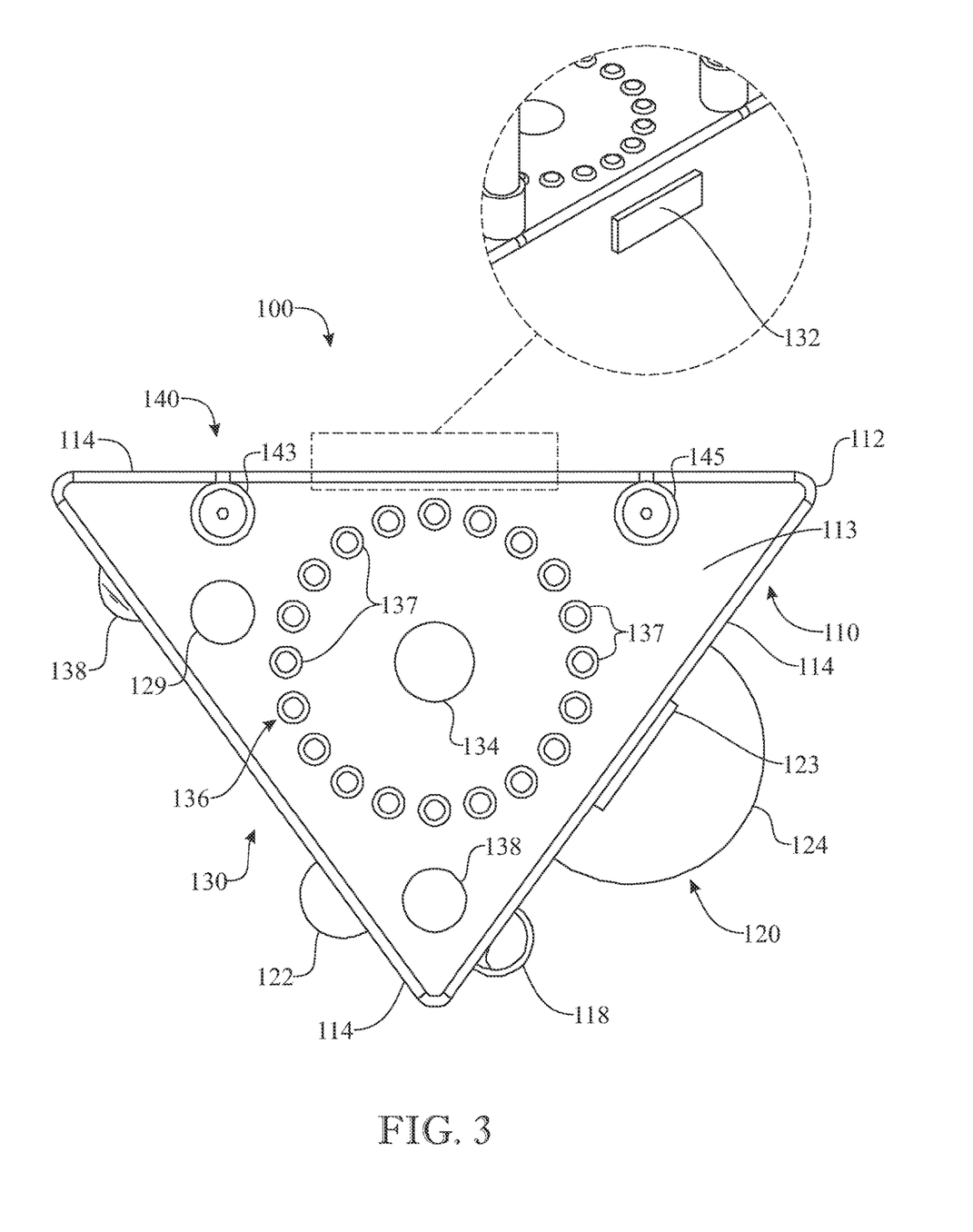
FIG. 3 presents a top plan view of an illustrative embodiment of a self-contained disaster condition monitoring system, in accordance with the present invention.
Figure 4:
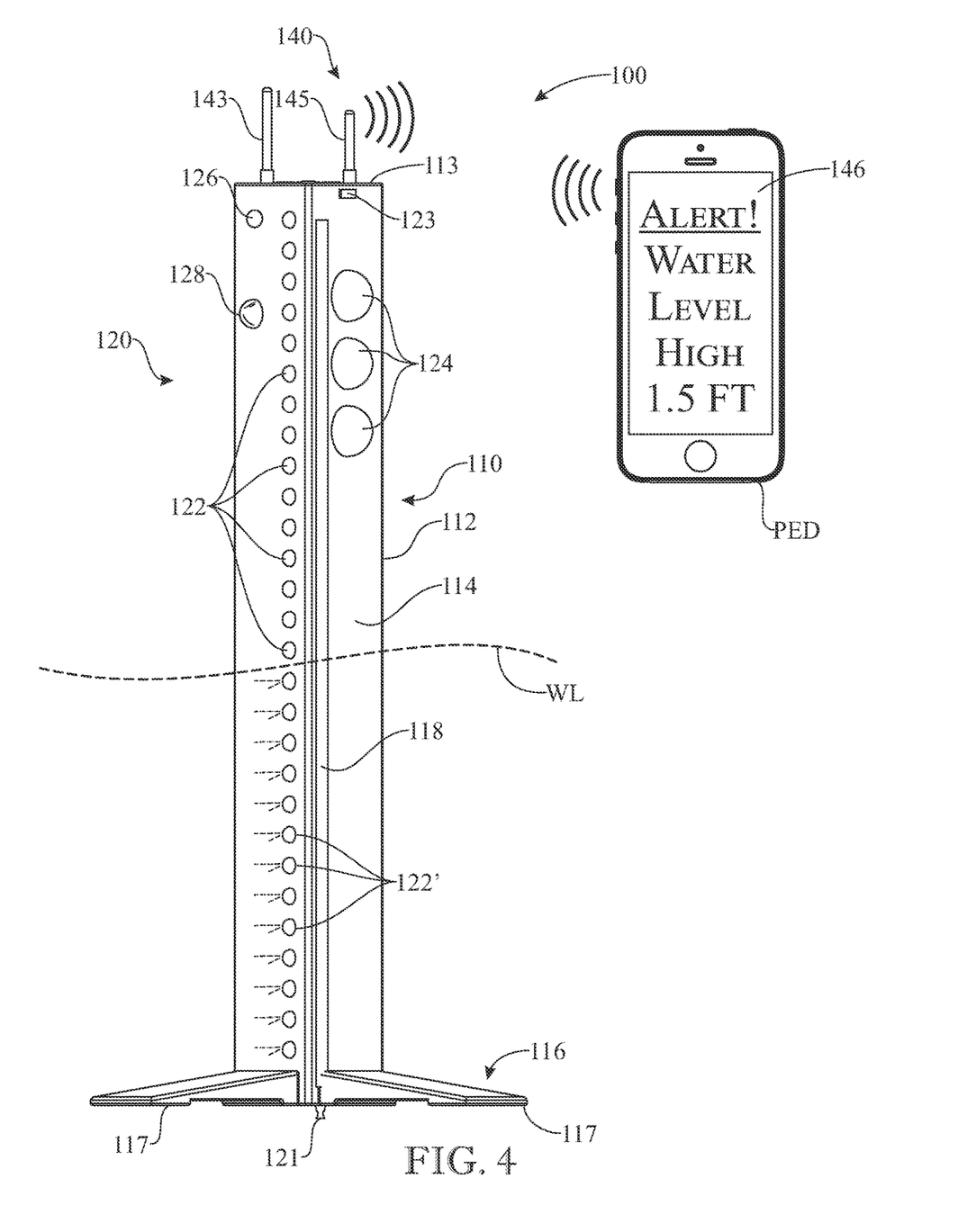
FIG. 4 presents a front elevation of the illustrative embodiment of the self-contained disaster condition monitoring system of FIG. 1 transmitting a direct SMS alarm message indicative of a high water level condition, in accordance with the present invention.

As with the disaster condition sensors mentioned above, a self-contained monitoring assembly 120 in accordance with the present invention may comprises any of a number of other disaster condition detectors including, but not limited to, a trace water detector 121, such as is shown by way of example in the illustrative embodiment of FIGS. 2 and 4, configured to detect nominal amounts of water proximate a bottom 115 of a self-contained housing assembly 110, which may be a precursor to forthcoming flood conditions. In at least one embodiment of the present invention, one or more trace water detectors 121 are configured to extend outward from the bottom 115 of the self-contained housing assembly 110 and are spring-loaded so as to assure positive contact with the underlying surface on which the present self-contained disaster condition monitoring system 100 is staged. In one further embodiment, a self-contained monitoring assembly 120 in accordance with the present invention may include a seismic activity detector 125, such as is represented schematically in FIG. 1. A seismic activity detector 125 in accordance with at least one embodiment of the present invention comprises an accelerometer which is configured to detect rapid and at least temporarily sustained movements in the underlying surface on which the present self-contained disaster condition monitoring system 100 is staged. In at least one further embodiment, a self-contained monitoring assembly 120 includes a radiation detector 128, such as is shown by way of example in FIGS. 1, 3 and 4, which is configured to monitor and measure an amount of alpha and beta radiation proximate a self-contained housing assembly 110 of a self-contained disaster condition monitoring system 100 in accordance with the present invention, such as may be present as a result of a nuclear accident, or worse, a nuclear attack. In at least one embodiment, a radiation detector 128 comprises a Geiger counter.

Figure 6:
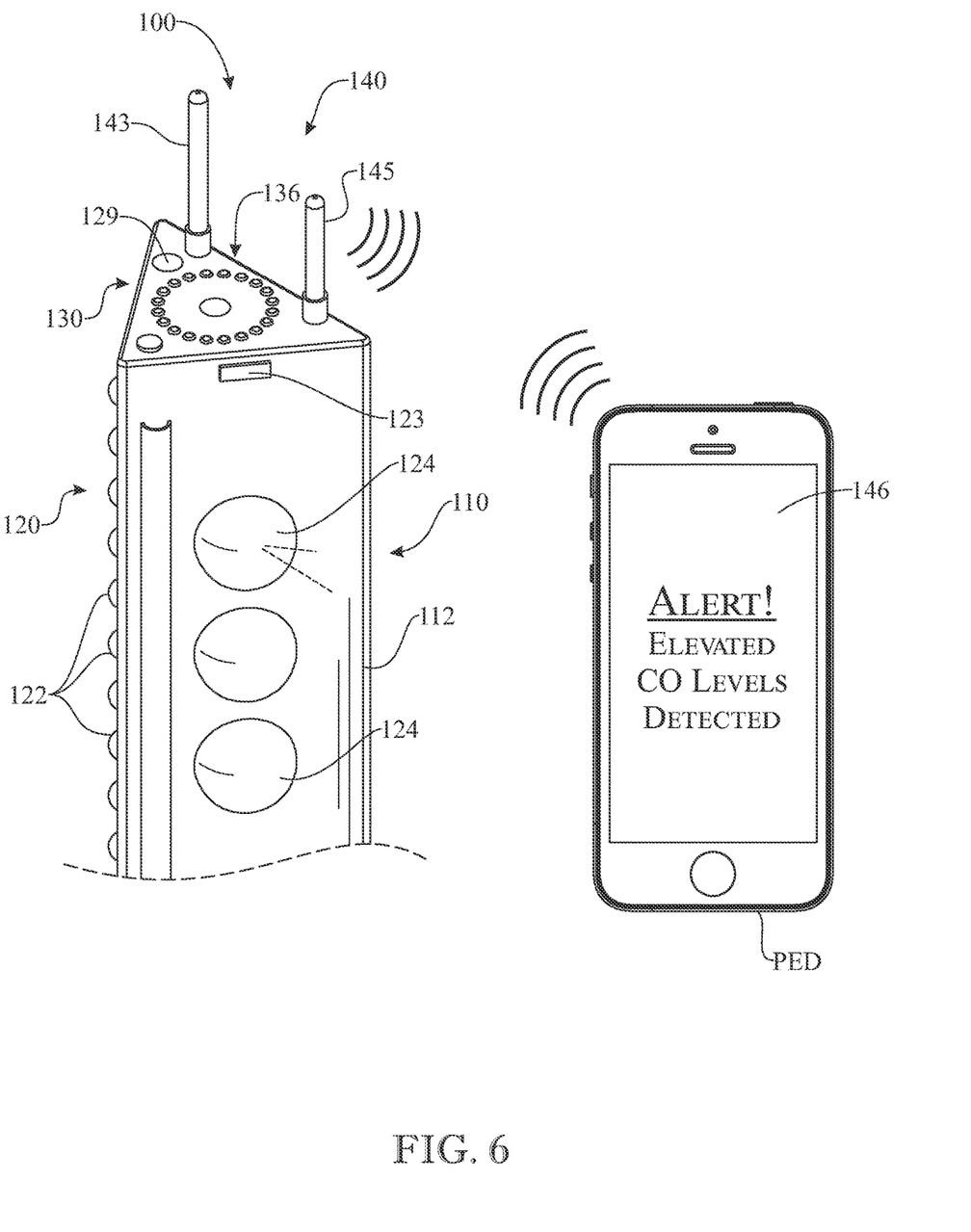
FIG. 6 presents a partial front perspective view of the illustrative embodiment of the self-contained disaster condition monitoring system of FIG. 1 transmitting a direct SMS alarm message indicative of a hazardous gas condition, in accordance with the present invention.

In yet another embodiment, a self-contained monitoring assembly 120 comprises a camera 129 which is positioned on a housing unit 112 of a self-contained housing assembly 110, such as is shown by way of example in the illustrative embodiments of FIGS. 3 and 6. More particular, a camera 129 is positioned to capture and is configured to relay one or more still photographs and/or video recordings of the location immediately proximate where a present self-contained disaster condition monitoring system 100 in accordance with the present invention is operably staged. As such, the present self-contained disaster condition monitoring system 100 allows a user to view in real or near-real-time the state of a location in which the present system 100 is staged, before, during, and after exposure to a disastrous condition.

A self-contained disaster condition monitoring system 100 in accordance with at least one embodiment of the present invention further comprises a user interface assembly 130. The user interface assembly 130 includes a power button 132 to allow the user to quickly and easily activate the present self-contained disaster condition monitoring assembly 100 prior to evacuating a location, such as may be required in view of an impending and potentially hazardous condition occurring at the location. In at least one embodiment, a user interface assembly 130 comprises a selection button 134 which is disposed and readily accessible on the top 113 of a housing unit 112, such as is shown best by way of example in the illustrative embodiment of FIG. 3, and which is operable to configure one or more disaster condition sensors or disaster condition detectors of a self-contained monitoring assembly 120. More in particular, in at least one embodiment a selection button 134 allows a user to select from a plurality of configuration parameters such as, by way of example only, which of a plurality of disaster condition sensors and/or disaster condition detectors are to actively monitor for and measure a disaster condition when the system 100 is actuated, as well as to select and set at least one disaster condition alarm limit for each of the plurality of disaster condition sensors and/or disaster condition detectors activated.

It is to be appreciated that a plurality of disaster condition alarm limits may be selected and set for any of the plurality of disaster condition sensors and/or disaster condition detectors of a self-contained monitoring assembly 120 in accordance with the present invention. As one example, a disaster condition alarm limit may comprise a threshold disaster condition alarm limit indicative of an initial onset of a hazardous condition. Additionally or alternatively, a disaster condition alarm limit may be selected which is indicative of an ongoing hazardous condition, such as a high temperature or an elevated hazardous gas level.

A user interface assembly 130 in at least one embodiment further comprises an LED status indicator 136. With reference once again to FIG. 3, an LED status indicator 136 comprises a plurality of LED lights 137 arranged in a generally circular orientation around a selection button 134. As will be appreciated, each of the plurality of LED lights may be programmed so as to be operable in a plurality of lighting arrays each indicative of a different one of a plurality of configuration parameters. More in particular, each of the plurality of LED lights may be programmed to turn on or off, as well as to blink, pulse, or strobe, each indicative of a different one of the plurality of configuration parameters. Further, each of the plurality of LED lights may be programmed to display a different one plurality of colors, once again, each indicative of a different one of the plurality of configuration parameters. Looking again to the illustrative embodiment of FIG. 3, an LED status indicator 136 comprises twenty separate LED lights 137, each of which may be programmed to turn on or off, to blink, pulse or strobe in any of a plurality of colors. As will be appreciated, the plurality of LED lights 137 of an LED status indicator 136 in accordance with the present invention may be programmed to be operable in an almost infinite plurality of lighting arrays, each indicative of a different one of a plurality of configuration parameters, and each of which is available to a user in order to configure the operation of the present self-contained disaster condition monitoring system 100.

In accordance with at least one embodiment of the present invention, a user-interface assembly 130 further comprises an audible indicator and/or alarm 138. As may be seen from FIG. 3, an audible indicator and/or alarm 138 is also disposed on the top 113 of the housing unit 112 of the self-contained housing assembly 110. An audible indicator and/or alarm 138 in at least one embodiment is operable with a selection button 134 and/or an LED status indicator 136 to facilitate configuring the operation of the present self-contained disaster condition monitoring system 100 by a user, for example, by generating one or more audible tones to indicate to a user a particular configuration parameter has been properly selected. An audible indicator and/or alarm 138 in at least one further embodiment may be utilized to sound an audible alarm to alerts person at a location of an impending hazardous condition such as may occur when one or more hazardous condition sensors and/or hazardous condition detectors measure a threshold disaster condition alarm limit indicative of an initial onset of one or more hazardous conditions.

A self-contained hazardous condition monitoring system 100 in accordance with at least one embodiment of the present invention further comprises a communication assembly 140. In at least one embodiment, a communication assembly 140 includes a wireless fidelity or Wi-Fi communication module 142, such as is represented diagrammatically in the illustrative embodiment of FIG. 7, to provide a communication connection to the Internet. More in particular, at least one embodiment a Wi-Fi communication module 142 is operable with a Wi-Fi antenna 143 to connect to the Internet such as may be warranted from time to time to download software updates and/or install new drivers for operation of one or more hazardous condition sensors and/or hazardous condition detectors of a self-contained monitoring assembly 120 in accordance with the present invention.

Figure 7:
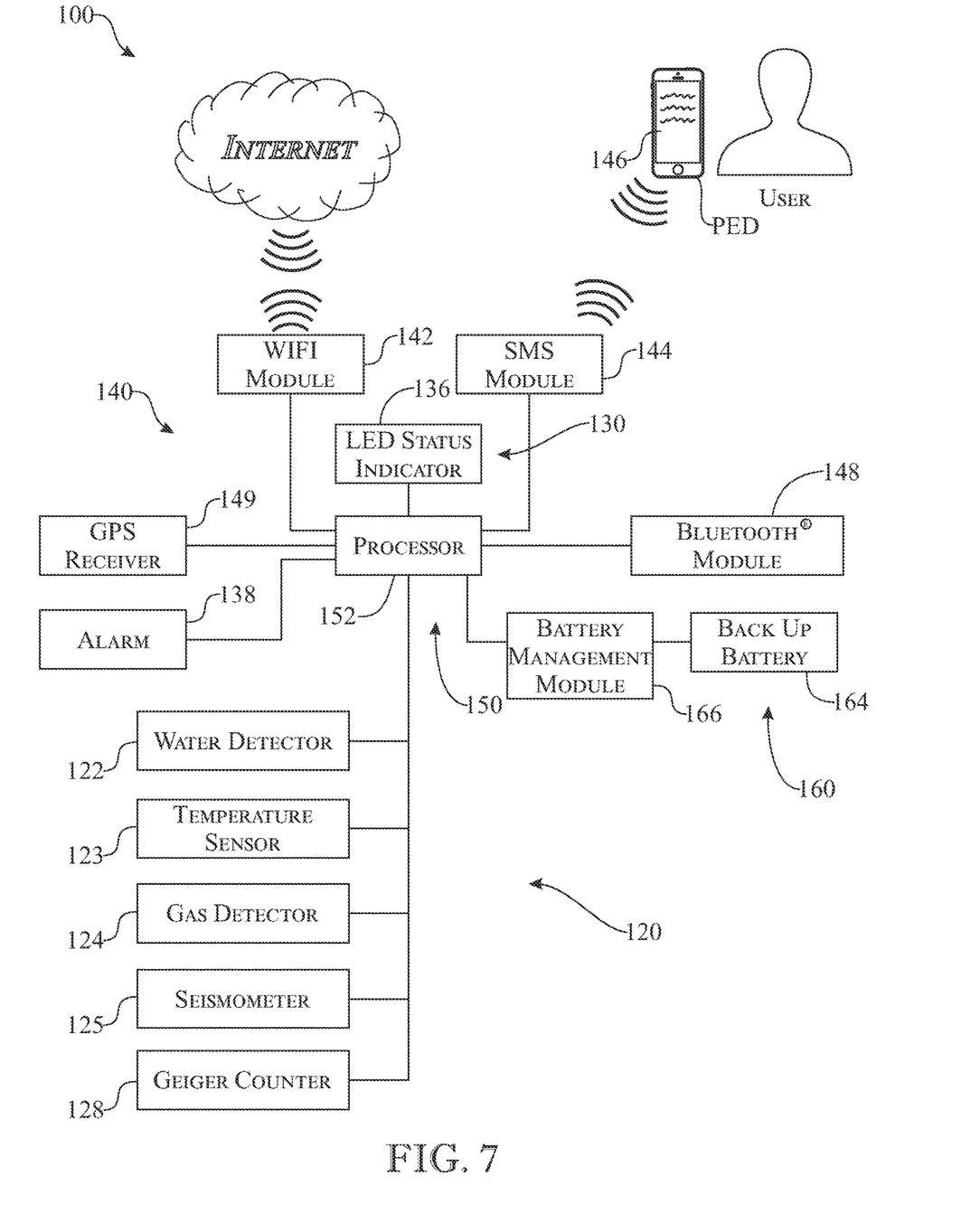
FIG. 7 presents a diagrammatic representation of one further illustrative embodiment of a self-contained disaster condition monitoring system, in accordance with the present invention.

In at least one further embodiment, a communication assembly 140 of the present self-contained hazardous condition monitoring system 100 further comprises a short message service or SMS communication module 144, once again, represented diagrammatically in the illustrative embodiment of FIG. 7. An SMS communication module 144 in at least one embodiment is operative with a subscriber identity module or SIM card (not shown) compatible with at least one cellular communication network proximate the location in which the present self-contained hazardous condition monitoring system 100 is to be staged. More in particular, a compatible SIM card allows an SMS communication module 144 to communicate directly via the at least one cellular communications network. In at least one embodiment, the communication assembly 140 further comprises an SMS antenna 145 to facilitate communication between the SMS communication module 144 and the at least one cellular communications network to permit one or more direct SMS alarm messages 146 to be transmitted therefrom, as is discussed in further detail hereinafter.

A communication assembly 140 at least one further embodiment also includes a short-range wireless communication module 148, also represented diagrammatically as a BLUETOOTH® communication module 148 in the illustrative embodiment of FIG. 7. A short-range wireless communication module 148 in at least one embodiment is configured to be communicative with a personal electronic device of a user so as to facilitate configuration of one or more a plurality of configuration parameters in order to configure the operation of the present self-contained disaster condition monitoring system 100. Alternatively or additionally, a short-range wireless communication module 148 is configured to be communicative with a personal electronic device of a user so as to facilitate download software updates and/or install new drivers for operation of one or more hazardous condition sensors and/or hazardous condition detectors of a self-contained monitoring assembly 120. A short-range wireless communication module 148 may also be configured to be communicative with a personal electronic device of a user so as to allow a user to input and save one or more a plurality of configuration parameters including, but in no manner limited to, a device identifier, a local time zone, a preferred language, preferred units of measure, a direct SMS link to one or more user personal electronic devices, Wi-Fi access information, e.g., a router ID and passcode, and/or website or web server addresses to access as needed for initial configuration, software updates and/or driver updates or patches, just to name a few.

In still another embodiment, a communication assembly 140 of the present self-contained disaster condition monitoring system 100 includes a global positioning system or GPS receiver 149 configured to receive a GPS signal such that a location of a self-contained disaster condition monitoring system 100 in accordance with the present invention may be precisely identified at any time while the system is actuated. As one example, a change in the location of a self-contained disaster condition monitoring system 100 in accordance with the present invention may be indicative of a hazardous condition such as a flood in which the system 100 was carried away in floodwaters and/or all or a portion of a structure in which the system 100 was deployed was carried away in floodwaters and/or a mudslide. As another example, a change in the location of a self-contained disaster condition monitoring system 100 in accordance with the present invention may be indicative of a hazardous condition such as a tornado or hurricane in which the system 100 was picked up and carried away in the high winds accompanying such disastrous weather events.

A self-contained disaster condition monitoring system 100 in accordance with the present invention further comprises a controller assembly 150. More particular, a controller assembly 150 includes a processor 152 which is disposed in communication with a self-contained monitoring assembly 120, and more in particular, in communication with the disaster condition sensors or disaster condition detectors of the self-contained monitoring assembly 120. Further, a processor 152 is disposed in communication with the self-contained monitoring assembly 120, and more in particular, with the plurality of disaster condition sensors or disaster condition detectors, to receive one or more disaster condition alarm signals generated therefrom. The processor 152 in one further embodiment is configured to communicate with the communication assembly 140 upon receipt of one or more disaster condition alarm signals from the self-contained monitoring assembly 120. In one further embodiment, a processor 152 is configured to instruct a communication assembly 140, and more in particular, to instruct an SMS communication module 144 thereof to generate and transmit one or more direct SMS alarm message 146 to a personal electronic device of the user, once again, as described in further detail below, upon receipt of one or more disaster condition alarm signals from a self-contained monitoring assembly 120.

A self-contained disaster condition monitoring system 100 in accordance with the present invention includes a power supply assembly 160. In at least one embodiment, a power supply assembly 160 includes an external power interconnect 162, such as is shown by way of example in the illustrative embodiment of FIG. 2, which allows the present system 100 to be powered by an external power source such as via an electrical outlet interconnected to a municipal electrical distribution grid which services the location in which the present system 100 is staged. Alternatively, an external power interconnect 162 is operably connected to an external electrical power source proximate the location in which the present system 100 is staged, for example, a solar powered electrical generating system, a wind powered electrical generating system, a hydro powered electrical generating system, etc. More in particular, electrical power is provided via the electrical power interconnect 162 to operate a self-contained sensor assembly 120, a user interface assembly 130, a communication assembly 140, and a controller assembly 150.

A power supply assembly 160 in accordance with the present invention also includes a self-contained backup power supply 164, such as is represented diagrammatically in the illustrative embodiment of FIG. 2. Specifically, a self-contained backup power supply 164 is configured to provide electrical power to a self-contained sensor assembly 120, a user interface assembly 130, a communication assembly 140, and a controller assembly 150, upon detection of an interruption of an electrical power supply via the electrical power interconnect 162. In one further embodiment, a power supply assembly 160 includes a power management module 166 configured to monitor an electrical power supply provided via the electrical power interconnect 162, and to bring a self-contained backup power supply 164 online to provide power to the present self-contained disaster condition monitoring system 100 in the event an interruption in an electrical power supply from the electrical power interconnect 162 is detected.

With the foregoing understanding of the various components of a self-contained disaster condition monitoring system 100, examples of the setup and operation of the system 100 are now presented. As an initial matter, upon activation of the present self-contained disaster condition monitoring system 100, such as by depressing power button 132, the processor 152 retrieves any of a plurality of configuration parameters from a non-volatile memory, if any such configuration parameters have previously been saved. The processor 152 then initializes a self-contained monitoring assembly 120, and more in particular, a plurality of disaster condition sensors and/or disaster condition detectors thereof, as discussed in detail hereinabove. The processor 152 also initializes the user interface assembly 130 and a communications assembly 140, and again, more particular, the specific components thereof as also previously described in detail.

After initializing the various assemblies and their corresponding components, the processor 152 runs a system check to detect and record any faults. Assuming an SMS link has been established with a user's personal electronic device, such as via a cellular phone number to connect to a user's cellphone or smartphone, the processor 152 will instruct the SMS communication module 144 to generate and transmit a direct SMS text message to the user's personal electronic device documenting any faults detected during the initial system check and/or to confirm activation of the present self-contained disaster condition monitoring system 100.

After activation of the present self-contained disaster condition monitoring system 100, in at least one embodiment, the system 100 enters a run mode. While in run mode, a user may generate and transmit a coded direct SMS text message to the SMS communication module 144 so as to link a user's personal electronic device to a particular self-contained disaster condition monitoring system 100, as well as to store the user's cellular phone number into a non-volatile memory. While in run mode, the processor 152 continually monitors the operation of the various system components including the plurality of disaster condition sensors and/or disaster condition detectors of the self-contained monitoring assembly 120, and may instruct the Wi-Fi communication module 142 to establish a connection to the Internet to obtain software and/or driver updates and/or patches as deemed necessary based on periodic system checks. In addition, at least one embodiment, the processor 152 is configured to instruct the SMS communication module 144 to generate and transmit a direct SMS text message to the user's personal electronic device indicating the current operational status of the system 100 including, among other things, any faults detected and/or any upgrades applied, and the processor 152 may be configured to instruct the SMS communication module 144 to generate and transmit such a direct SMS text message on a periodic basis and/or on-demand upon receipt of a direct SMS text message from a user's personal electronic device requesting such an update. In at least one further embodiment, the processor 152 also monitors power consumption of the present system via the power management module 166 of a power supply assembly 160. The processor 152 is further configured in at least one embodiment the cause the SMS communication module 144 to disconnect from a cellular communications network and power down when a low level is reported in a self-contained backup power supply 164 by a power management module 166, as well as when power to the entire system 100 is disconnected, such as occurs via operation of the power button 132.

Upon receipt of one or more disaster condition alarm signals generated by the self-contained monitoring assembly 120, the processor 152 may instruct the user interface assembly 130 to signal an alarm via the LED status indicator 136 and/or the audible indicator and/or alarm 138. Additionally, upon receipt of one or more disaster condition alarm signals generated by the self-contained monitoring assembly 120, the processor 152 instructs the SMS communication module 144 to generate and transmit one or more direct SMS alarm messages 146 to at least one user personal electronic device. It is to be appreciated that the self-contained disaster condition monitoring system 100 in accordance with the present invention may be configured such that an SMS communication module 144 generates and transmits one or more direct SMS alarm messages 146 to each of a plurality of user personal electronic devices.

In at least one embodiment, a self-contained backup power supply 164 of the present system 100 is fully charged from the factory, a prepaid SIM card is installed, and the cellular number corresponding to the SIM card installed in the system 100 is recorded so that a user may quickly and easily connect his or her personal electronic device to the present system 100. More in particular, a user simply powers up the present system 100 by connecting to an external electrical power supply via an external power interconnect 162, or in the absence of an external electrical power supply, the system 100 operates via the fully charged self-contained backup power supply 164. Next, the user sends a direct SMS text message to the cellular number corresponding to the system 100 from the user's personal electronic device, and the system 100 retains the user's cellular number. These are the only actions required of a user to configure the system 100 in accordance with at least one embodiment of the present invention. All other configuration actions described herein are optional. Lastly. and importantly, in the event of an evacuation, the user simply deploys the present system 100 in an appropriate location, such as near an entrance doorway, connects the system 100 to an external electrical power supply via an external power interconnect 162, or powers the system 100 via the fully charged self-contained backup power supply 164, and the system 100 is fully operational to monitor for and to transmit a direct SMS alarm message 146 to the user's personal electronic device upon detection of one or more disaster conditions.

With reference to the illustrative embodiment of FIG. 4, a front elevation of an illustrative embodiment of the self-contained disaster condition monitoring system 100 is presented. More in particular, as shown in FIG. 4, a plurality of water level sensors 122 of a self-contained monitoring assembly 120 are mounted along one side 114 of a self-contained housing assembly 110. In accordance with at least one embodiment of the present invention, the plurality of water level sensors 122 of a self-contained monitoring assembly 120 are configured such that upon contact with water, the disaster condition alarm signals generated by each of a plurality of water level sensors 122 which are in contact with at any given time are combined to produce a single disaster condition alarm signal indicative of an approximate level of water proximate the self-contained disaster condition monitoring system 100. With reference again to FIG. 4, about half of the plurality of water level sensors 122 are submerged below the water level WL and are operative with the water detector return 118, i.e., each submerged water level sensor 122 is bridged with the water detector return 118 such that the disaster condition alarm signals generated by each of the plurality of submerged water level sensors 122' are combined to result in the processor 152 instructing the SMS communication module 144 to generate and transmit a direct SMS alarm message 146 indicative of a high water level condition of about 1.5 feet to a user's personal electronic device PED.

Figure 5:
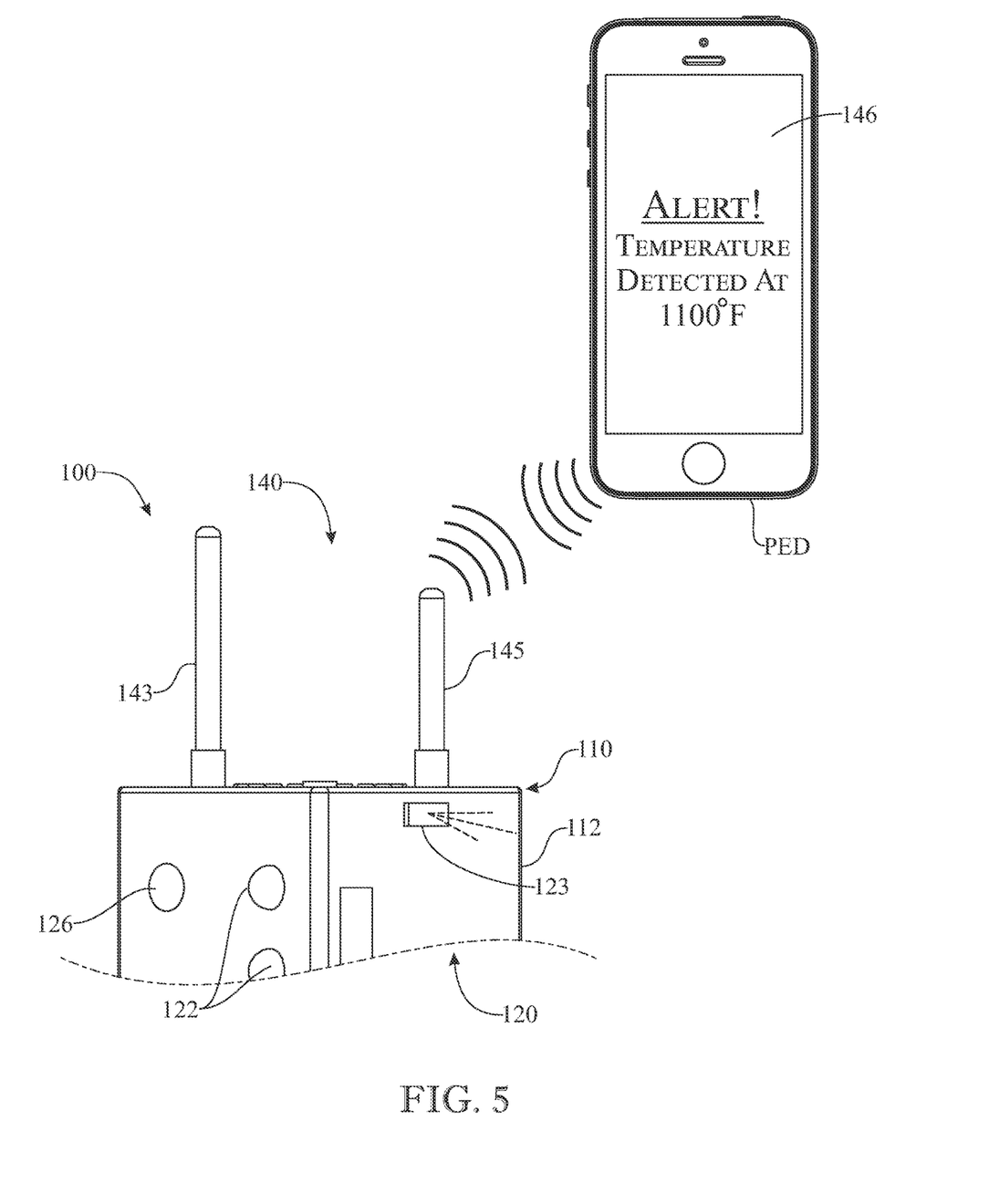
FIG. 5 presents a partial front elevation of the illustrative embodiment of the self-contained disaster condition monitoring system of FIG. 1 transmitting a direct SMS alarm message indicative of a high temperature condition, in accordance with the present invention.

Looking next to the illustrative embodiment of FIG. 5, a partial front elevation of another illustrative embodiment of a self-contained disaster condition monitoring system 100 is presented, wherein a temperature sensor 123, such as a thermocouple, has detected a high temperature condition and has transmitted a disaster condition alarm signal indicative of the same. The disaster condition alarm signal indicative of a high temperature condition proximate the self-contained disaster condition monitoring system 100 is transmitted to the processor 152, and the processor 152 instructs the SMS communication module 144 to generate and transmit a direct SMS alarm message 146 indicative of a high temperature condition to a user's personal electronic device PED. In the illustrative embodiment of FIG. 5, the high temperature condition indicated is 1,100° F. which corresponds to the average temperature observed in common house fires. As will be appreciated, a thermocouple utilized in a temperature sensor 123 in accordance with the present invention may be selected such that a disaster condition alarm signal indicative of a high temperature condition is generated at a temperature which is greater or less than 1,100° F. such as may be warranted depending on the particular location in which the present self-contained disaster condition monitoring system 100 is staged and actuated.

Lastly, attention is directed to the illustrative embodiment of FIG. 6, in which a partial front elevation of another illustrative embodiment of a self-contained disaster condition monitoring system 100 is presented, wherein a hazardous gas detector 124 has detected a high level of carbon monoxide and has transmitted a disaster condition alarm signal indicative of the same. The disaster condition alarm signal indicative of a high carbon monoxide level proximate the self-contained disaster condition monitoring system 100 is transmitted to the processor 152, and the processor 152 instructs the SMS communication module 144 to generate and transmit a direct SMS alarm message 146 indicative of a high carbon monoxide level to a user's personal electronic device PED. As before, it is to be appreciated that a hazardous gas detector 124 of a self-contained monitoring assembly 120 in accordance with the present invention may be specifically configured to detect one or more of a number of known hazardous gases at various levels deemed to be hazardous, such as described in detail hereinabove.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A self-contained disaster condition monitoring system dimensioned and configured for rapid deployment onto a supporting surface in a building and activation prior to evacuation of the building and to transmit directly to a user's designated personal electronic device via a cellular communication network data indicative of one or more disaster conditions in the building, said system comprising:

a self-contained housing assembly having a housing unit with a base unit including a plurality of self-leveling support legs mounted to a portion thereof to maintain said housing unit in an operative monitoring orientation;

said self-contained housing assembly equipped with a self-contained monitoring assembly comprising a spring-loaded trace water detector, a plurality of water level sensors, and one or more of a temperature sensor, a hazardous gas detector and a radiation detector;

said spring-loaded trace water detector configured to extend downwardly from said bottom portion of said self-contained housing assembly into direct positive contact with the underlying supporting surface in the building to detect the presence of a trace amount of water under said bottom portion of said self-contained housing assembly;

each of said plurality of water level sensors positioned and configured to electrically bridge with a water detector return when submerged in water such that a different high water level corresponding to a different one of each of said plurality of water level sensors may be detected;

a user interface assembly comprising a selection button and a light-emitting diode status indicator;

said user interface assembly operable to configure each of said water trace detector, said water level sensor, said temperature sensor, said hazardous gas detector and said radiation detector of said self-contained monitoring assembly with at least one corresponding disaster condition alarm limit;

a controller assembly comprising a processor disposed in communication with said self-contained monitoring assembly to receive one or more disaster condition alarm signals from said self-contained monitoring assembly;

a communication assembly including a short message service communication module having a subscriber identity module communicative with the cellular communications network and a short message service antenna collectively configured to transmit a direct short message service alarm message directly to the user's designated personal electronic device;

said processor further configured to communicate with said communication assembly upon receipt of one or more disaster condition alarm signals from said self-contained monitoring assembly and to instruct said communication assembly to transmit to said direct short message service alarm message; and a power supply assembly disposed to provide power to said self-contained sensor assembly, said user interface assembly, said communication assembly and said controller assembly.

* * * * *